PROCESS FOR THE PREPARATION OF NITROSYL SULFURIC ANHYDRIDE

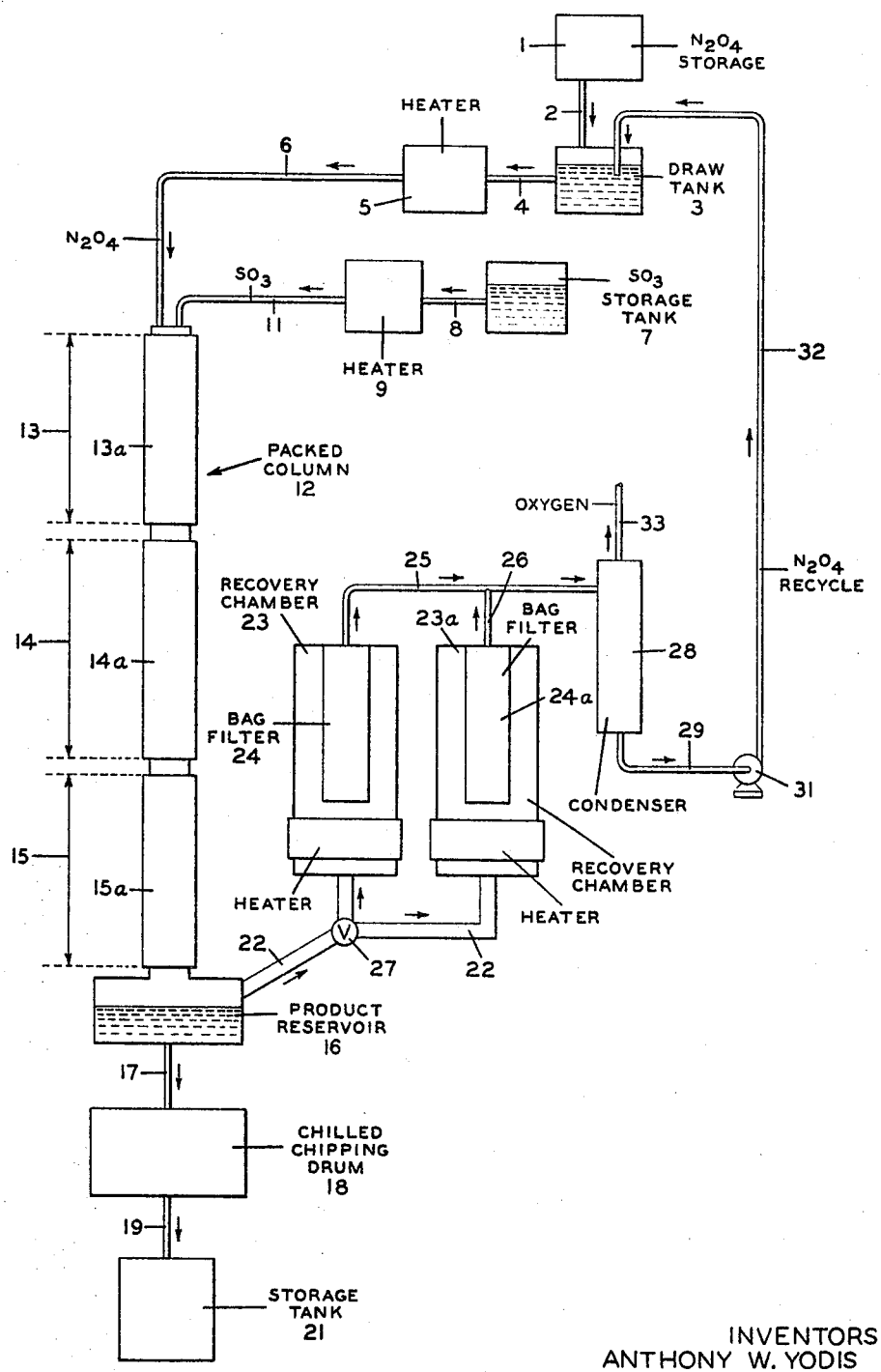

Anthony W. Yodis, Whippany, Walter G. Schnoor, Morristown, and John E. Wilkalis, Morris Plains, N.J., assignors to Allied Chemical Corporation, New York, N.Y., a corporation of New York
Filed Dec. 20, 1962, Ser. No. 246,271
6 Claims. (Cl. 23—139)

This invention relates to the preparation of nitrosyl sulfuric anhydride and, more particularly, refers to a new and improved process for producing nitrosyl sulfuric anhydride of exceptional purity and in high yield.

Nitrosyl sulfuric anhydride, also referred to as dinitrosyl pyrosulfate, was first prepared more than a century ago, and may be utilized as a nitrosating or diazotization agent. Various processes for the production of nitrosyl sulfuric anhydride have been proposed in the art, but have usually required at least one reactant to be in liquid form. Illustrative of such reactions include reaction of dinitrogen tetroxide with sulfur dioxide or pyrosulfuryl chloride and reaction of nitrosyl sulfuric acid with phosphorus pentoxide. These liquid phase reactions produce secondary reaction products which must be removed from the reaction mixture in order to secure nitrosyl sulfuric anhydride of acceptable quality. Such purification procedures are expensive and time consuming and naturally add to cost of manufacture which, in turn, tend to render such processes uneconomical.

Moreover, to preclude the formation of nitrosyl sulfuric acid in liquid phase reactions, moisture must be excluded not only from reaction vessels but also from the individual reactants. Thus, reaction precautions are necessary in order to insure such anhydrous condition.

An object of the present invention is to provide a simple and economical process for producing nitrosyl sulfuric anhydride. Another object is to provide a simple and economical process for producing nitrosyl sulfuric anhydride in substantially theoretical yield and of exceptional purity. Other objects will be apparent from the following description.

It has now been found that substantially pure nitrosyl sulfuric anhydride may be produced in yield approaching 100 percent theoretical by vapor phase reaction of dinitrogen tetroxide and sulfur trioxide. This reaction may be represented by the following equation:

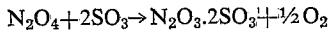

$$N_2O_4 + 2SO_3 \rightarrow N_2O_3 \cdot 2SO_3 + \tfrac{1}{2} O_2$$

Accordingly, substantially pure nitrosyl sulfuric anhydride is produced by reacting dinitrogen tetroxide with sulfur trioxide in vapor phase at temperature of about 200° C. to about 550° C. and recovering the nitrosyl sulfuric anhydride from the resulting reaction mixture.

The reaction temperature of the present process is desirably from about 200° C. to about 550° C. It has been found that the employment of temperatures below 200° C. results in a reaction product having an undesirably high content of dinitrogen tetroxide. On the other hand, temperatures in excess of 550° C. serve no useful purpose and tend to promote decomposition of the reaction product. In preferred operation, temperatures from above 350° C. (the boiling point of nitrosyl sulfuric anhydride) to about 450° C. are utilized since such range has been found to produce nitrosyl sulfuric anhydride of optimum purity. More specifically, when this preferred reaction temperature range is employed, the dinitrogen tetroxide content of the reaction product is reduced to less than 0.05 percent by weight. Further, since this temperature range maintains the reaction product in the vapor state, recovery is readily effected by simply cooling the reaction mixture to liquefy and finally solidify the nitrosyl sulfuric anhydride.

Although stoichiometric molar ratio of 0.5 mol dinitrogen tetroxide per mol sulfur trioxide may be employed, it has been found that in order to produce nitrosyl sulfuric anhydride of substantially theoretical composition, an excess of dinitrogen tetroxide should be employed. It is therefore, preferred to employ molar ratio of about 0.6 to 0.75 mol dinitrogen tetroxide although typical molar ratios generally employable herein range from about 0.5 to 1 mol of dinitrogen tetroxide per mol of sulfur trioxide per mol sulfur trioxide. Use of a larger excess of dinitrogen tetroxide gives little additional benefit and subjects subsequent apparatus for condensing unreacted dinitrogen tetroxide to unnecessary loading.

The vapor phase reaction of this invention is conveniently carried out by utilizing a suitable reaction vessel which contains at least two, and preferably three, independently heated zones. Normally a packed column having three such zones and equipped with suitable means for isolating and recovering nitrosyl sulfuric anhydride is utilized. In this column, the first zone is kept at temperature above 350° C. to about 450° C. The second and third zones are progressively lower in temperature to provide for liquefaction of the product.

According to a more specific embodiment of the present invention, a recovery system is provided whereby the gaseous effluent separated from liquefied nitrosyl sulfuric anhydride product, which effluent contains uncondensed nitrosyl sulfuric anhydride, unreacted nitrogen tetroxide and reaction-produced oxygen, is further cooled to solidify the nitrosyl sulfuric anhydride, as additional product, and then to condense excess dinitrogen tetroxide which is recycled for use as vaporized feed. The remaining reaction-produced oxygen is then disposed of by venting.

The process of this invention may be carried out in batch manner, but continuous operation is preferably employed.

The accompanying drawing is a diagrammatic flow sheet illustrating one manner of carrying out the present invention. Dinitrogen tetroxide is withdrawn from storage tank 1 through line 2 into draw tank 3 wherein a constant hydrostatic head is maintained. Dinitrogen tetroxide proceeds through line 4 and through conventional heating chamber 5 which is maintained at a minimum temperature of 21° C. in order to convert the liquid dinitrogen tetroxide into its vapor state.

Liquid sulfur trioxide, preferably in stabilized form, is withdrawn from storage tank 7 and introduced through line 8 into conventional heating chamber 9 maintained at a minimum temperature of 44° C. in order to convert the liquid sulfur trioxide into its vaporized state.

The dinitrogen tetroxide and sulfur trioxide are concurrently introduced into packed column 12 as highly purified-gaseous feeds through lines 6 to 11, respectively. The molar ratio of the reactants is preferably about 0.6 to 0.75 mol dinitrogen tetroxide per mol sulfur trioxide. The packed column employed, utilizing conventional packing material such as ceramic material, may be an enclosed chamber of an acid-resistant metal such as duriron.

The packed column consists of three independently heated zones. The heating elements utilized to secure the various temperatures desired are of a conventional nature, such as electrical heating jackets 13a, 14a and 15a which contain thermostatic controls in order to maintain the reaction temperature within a desired range.

The reaction of dinitrogen tetroxide and sulfur trioxide is essentially carried to completion in heated zone 13 which is maintained at a temperature above 350° to 550° C., and preferably above 350° to 450° C. The reaction mixture enter heated zones 14 and 15 by reason of the pressure exerted by the gaseous feeds of the reactants. These heated zones are maintained at progressively lower temperatures in order to effect liquefaction of the resulting nitrosyl sulfuric anhydride product. In preferred operation zone 14 is maintained at a temperature of about 340° to 350° C. and thereafter gradually reduced to about 240° to 260° C. in heated zone 15.

The reaction product thereafter enters product reservoir 16 by gravitational flow. The temperature of product reservoir 16 is maintained between 210° and 220° C. in order to keep the nitrosyl sulfuric anhydride in its molten state and to minimize the vapor pressure of the resulting melt. The molten nitrosyl sulfuric anhydride is continuously withdrawn through line 17 to a chilled drum chipping machine 18 or other suitable device to freeze the product and, in the case of a chipping machine to form solid chips. The solid product is passed through line 19 to product storage tank 21.

In order to recover uncondensed nitrosyl sulfuric anhydride product and unreacted dinitrogen tetroxide, a recovery and recycling system is employed. Due to the flow of excess gaseous dinitrogen tetroxide and reaction-produced oxygen, there is a carry-over of product (as vapor) from reservoir 16 through duct 22 into recovery chamber 23 which contains a bag filter 24. This chamber is maintained at a temperature below 210° C., and preferably at ambient temperature, in order to effect solidification of nitrosyl sulfuric anhydride vapor. The solidified nitrosyl sulfuric anhydride is deposited on filter 24 which is intermittently shaken to drop the solid product to the bottom of chamber 23. If desired, a second recovery chamber 23a with bag filter 24a is provided so that when one recovery unit is in operation, the other is emptied of accumulated product. For example, as recovery unit 23 is emptied of product the gaseous overflow from reservoir 16 may be diverted by valve 27 to recovery unit 23a without any significant decrease in the rate or amount of production. The solid product at the bottom of chamber 23 or 23a is converted to molten form by means of a conventional heater and returned to reservoir 16.

Gaseous dinitrogen tetroxide together with reaction-produced oxygen is carried over from recovery chamber 23 or 23a and fed via line 25 or feed line 26 into 25 to condenser 28. Condenser 28 is maintained at a temperature below 21° C. in order to liquefy dinitrogen tetroxide which is subsequently withdrawn through line 29 and returned by pump 31 to draw-tank 3 via line 32. The cooling means employed in condenser 28 are conventional, such as a cold-water jacket or a simple refrigerant system. Oxygen, still present as a gas, is vented and disposed of through line 33.

It should be understood that many changes and modifications may be made in the above-described process. For example, the reactants may be introduced into heated zone 15 just above reservoir 16, which would then be maintained at a temperature of about 300° C. Also, if desired, recovery chambers 23 and 23a may be connected to the top of heated zone 13, which would be then maintained at a temperature of 200° to 220° C. to minimize product vaporization.

The following example is given for the purpose of illustrating the present invention. In the example, parts are by weight.

*Example*

Referring to the drawing, through column 12 in which zones 13, 14 and 15 were maintained at 400° C., 350° C. and 250° C., respectively, was fed gaseous sulfur trioxide at a rate of 300 parts per hour and gaseous dinitrogen tetroxide at a rate of 197 parts per hour. Product reservoir 16 was maintained at 215° C., and the resulting liquefied nitrosyl sulfuric anhydride collected therein. Additional nitrosyl sulfuric anhydride, as well as unreacted dinitrogen tetroxide, was collected in recovery unit 23. After 4 hours operation 1730 parts of nitrosyl sulfuric anhydride were produced, 1125 parts being recovered from reservoir 16 and 605 parts from recovery unit 23. 125 parts of unreacted dinitrogen tetroxide were recovered from condenser 28. The total yield obtained based upon the amount of sulfur trioxide charged was 98 percent of theoretical.

Analysis of the nitrosyl sulfuric anhydride showed, by weight, 31.1 percent $N_2O_3$ and 68.7 percent $SO_3$, as compared to the theoretical analysis of 32.2 percent $N_2O_3$ and 67.8 percent $SO_3$. Further analysis indicated a trace amount of $N_2O_4$ to the extent of 0.03 percent by weight.

The present invention may be embodied in other forms or carried out in other ways without departing from the spirit thereof. The above embodiment is, therefore, to be considered illustrative and not restrictive, the scope of the invention being indicated by the appended claims.

We claim:

1. A process for the preparation of nitrosyl sulfuric anhydride having the formula $N_2O_3 \cdot 2SO_3$ which comprises reacting sulfur trioxide and dinitrogen tetroxide in vapor phase at a temperature of about 200° to 550° C. and recovering the nitrosyl sulfuric anhydride from the resulting vaporous reaction mixture.

2. A process in accordance with claim 1 wherein the reaction temperature is from above 350° to 450° C.

3. A process in accordance with claim 1 wherein the molar ratio of dinitrogen tetroxide to sulfur trioxide is about 0.5 to 1:1.

4. A process in accordance with claim 1 wherein the molar ratio of dinitrogen tetroxide to sulfur trioxide is about 0.6 to 0.75:1.

5. A process for the preparation of nitrosyl sulfuric anhydride having the formula $N_2O_3 \cdot 2SO_3$ which comprises the steps of:
   (1) reacting about 0.5 to 1 mol dinitrogen tetroxide per mol sulfur trioxide in vapor phase at a temperature from about 200° to 550° C.,
   (2) cooling the reaction mixture to liquefy nitrosyl sulfuric anhydride,
   (3) further cooling the liquefied nitrosyl sulfuric anhydride to obtain solid product,
   (4) separating the gaseous effluent containing uncondensed nitrosyl sulfuric anhydride and unreacted dinitrogen tetroxide from the cooled reaction mixture of step (2), and
   (5) cooling the gaseous effluent to first solidify nitrosyl sulfuric anhydride as additional product and then to liquefy dinitrogen tetroxide.

6. A process for the preparation of nitrosyl sulfuric anhydride which comprises:
   (1) reacting about 0.6 to 0.75 mol dinitrogen tetroxide per mol sulfur trioxide in vapor phase at a temperature of above 350° to 450° C.,
   (2) cooling the reaction mixture to liquefy nitrosyl sulfuric anhydride,
   (3) further cooling the liquefied nitrosyl sulfuric anhydride to obtain solid product,
   (4) separating the gaseous effluent containing uncondensed nitrosyl sulfuric anhydride and unreacted dinitrogen tetroxide from the cooled reaction mixture of step (2),
   (5) cooling the gaseous effluent to first solidify nitrosyl sulfuric anhydride as additional product and then to liquefy dinitrogen tetroxide, and
   (6) recycling the dinitrogen tetroxide for reuse as vaporized feed.

References Cited by the Examiner

UNITED STATES PATENTS 1,047,576  12/1912  Schultze _____ 23—139
2,325,066  7/1943  Marcotte _____ 23—157 X

OTHER REFERENCES

Mellor: A Comprehensive Treatise on Inorganic & Theoretical Chemistry, vol. 8, Longmans, Green & Co., New York, 1928, pp. 696–704.

OSCAR R. VERTIZ, *Primary Examiner.*

H. T. CARTER, *Assistant Examiner.*